(12) United States Patent
Gopalarathnam et al.

(10) Patent No.: US 11,736,389 B2
(45) Date of Patent: Aug. 22, 2023

(54) UPLINK FAILURE REBALANCING

(71) Applicant: DELL PRODUCTS L.P., Round Rock, TX (US)

(72) Inventors: Sudharsan Dhamal Gopalarathnam, Bothell, WA (US); Vinoth Kumar Arumugam, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 99 days.

(21) Appl. No.: 17/232,936

(22) Filed: Apr. 16, 2021

(65) Prior Publication Data

US 2022/0337513 A1 Oct. 20, 2022

(51) Int. Cl.
*H04L 45/28* (2022.01)
*H04L 41/046* (2022.01)
*H04L 43/0811* (2022.01)
*H04L 47/26* (2022.01)

(52) U.S. Cl.
CPC ............ *H04L 45/28* (2013.01); *H04L 41/046* (2013.01); *H04L 43/0811* (2013.01); *H04L 47/26* (2013.01)

(58) Field of Classification Search
CPC ... H04L 45/28; H04L 41/046; H04L 43/0811; H04L 47/26
See application file for complete search history.

(56) References Cited

U.S. PATENT DOCUMENTS

| | | | |
|---|---|---|---|
| 10,992,515 B1 * | 4/2021 | Ranjit | H04L 41/06 |
| 11,140,083 B1 * | 10/2021 | Singireddy | H04L 47/125 |
| 2020/0374953 A1 * | 11/2020 | Majmundar | H04W 92/20 |
| 2022/0094740 A1 * | 3/2022 | Saride | H04L 43/0882 |

* cited by examiner

*Primary Examiner* — Charles C Jiang
*Assistant Examiner* — Shawn D Miller
(74) *Attorney, Agent, or Firm* — North Weber & Baugh LLP

(57) ABSTRACT

Embodiments herein facilitate the modification of data traffic load balancing on information handling systems affected by a networking information handling system having the status of one or more of its uplinks changed from operable to inoperable or from inoperable to operable. In one or more embodiments, an agent operating on or in conjunction with a networking information handling system (e.g., a TOR) detects a change in one its links. The agent sends a message to information handling system(s) (e.g., hosts) that are communicatively coupled to the TOR regarding the change in status. Based upon the TOR's message, a host may adjust its traffic load balancing to compensate for the status change. Embodiments, therefore, help efficiently utilize network pathways.

20 Claims, 8 Drawing Sheets

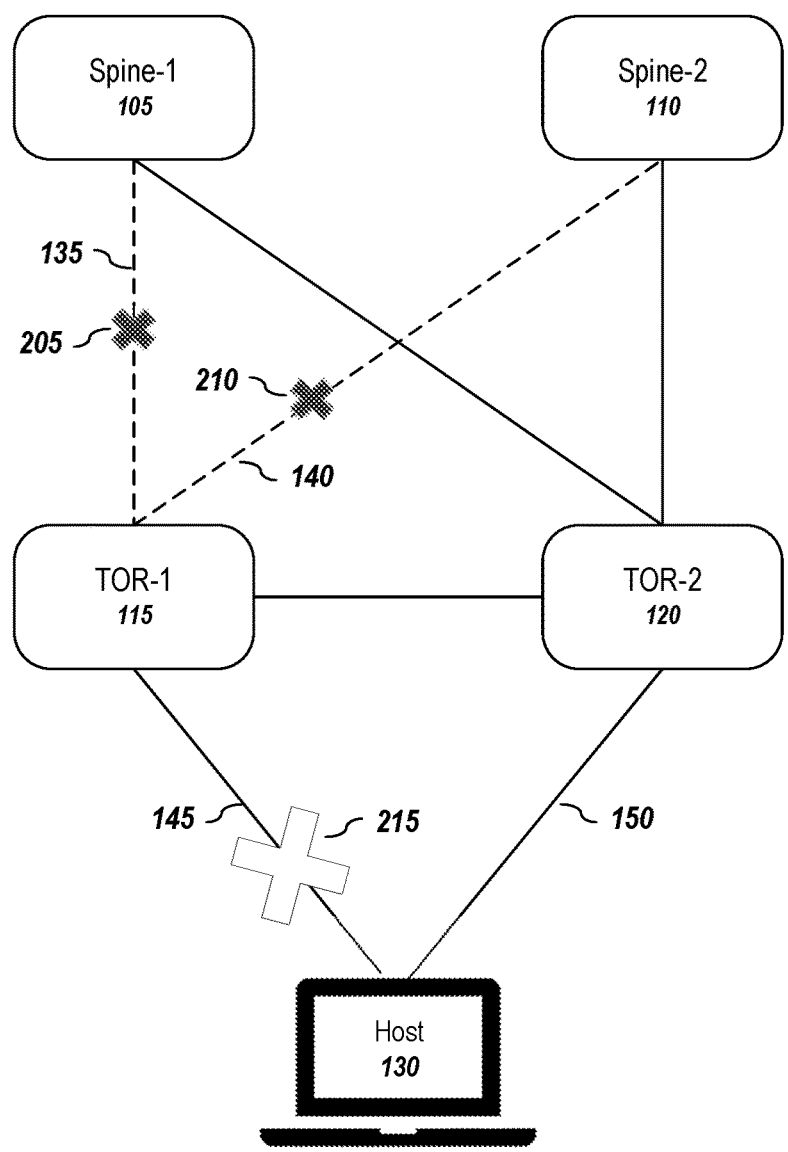
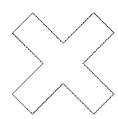 = Downlink shutdown after uplinks failures
FIG. 2

400

```
┌─────────────────────────────────────────────────────┐
│ Operating an agent on an information handling       │
│ system to monitor status of one or more uplinks of  │─ 405
│ the information handling system that provide access │
│ to one or more networks                             │
└─────────────────────────────────────────────────────┘
                          │
                          ▼
┌─────────────────────────────────────────────────────┐
│ Detecting, via the agent, a change of status of an  │─ 410
│ uplink of the information handling system           │
└─────────────────────────────────────────────────────┘
                          │
                          ▼
┌─────────────────────────────────────────────────────┐
│ Responsive to the agent detecting the change of     │
│ status of the uplink of the information handling    │
│ system, sending a message regarding the change of   │
│ status to an agent (e.g., a lightweight             │─ 415
│ coordinator (LWC)) operating on a network interface │
│ controller (NIC) of a host that is communicatively  │
│ coupled to the information handling system and is   │
│ potentially affected by the change of status of the │
│ uplink                                              │
└─────────────────────────────────────────────────────┘
```

FIG. 4

UPLINK FAILURE REBALANCING

BACKGROUND

A. Technical Field

The present disclosure relates generally to information handling systems. More particularly, the present disclosure relates to addressing link failures.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To improve network throughput and redundancy, many networks are configured with what is referred to as multi-homing. In multi-homing deployments, the top-of-rack (TOR) devices (which may be a switch or router) are typically configured or enabled with a feature called uplink failure detection (UFD) or link state tracker. When there is a failure in the configured number of uplinks for the TOR, the feature triggers downlink shutdown for the affected TOR so that traffic from downstream devices, such as a server (e.g., a host or other information handling system), can take an alternate path.

While there may be some benefits to this mechanism, it also has some significant drawbacks. Currently, downlinks are either operational or shutdown based on the number of uplinks that are expected to be active. If only one of the links fails, there is no action taken. Thus, the host will continue to send traffic to its connected TORs as if all paths are operational; however, one of the TORs has a link failure.

There is also a drawback to specifying the active number of uplinks. If, for instance, a TOR has three uplinks and a user specifies that there must be a minimum of two active uplinks, when two uplinks fail, the downlink(s) would be shut down—even if there is a bandwidth for one link. As a result, data traffic is completely diverted from the affected TOR to another branch or branches of the topology/network—even though the affected TOR could process at least some data. This scenario is suboptimal for network utilization.

Accordingly, it is highly desirable to find new, more efficient ways to address uplink failures.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 2 depicts the example network of FIG. 1 with link failures.

FIG. 4 depicts a method performed by an agent or agents operating to monitor the state of the uplinks, according to embodiments of the present disclosure.

DETAILED DESCRIPTION OF EMBODIMENTS

Figure 1:
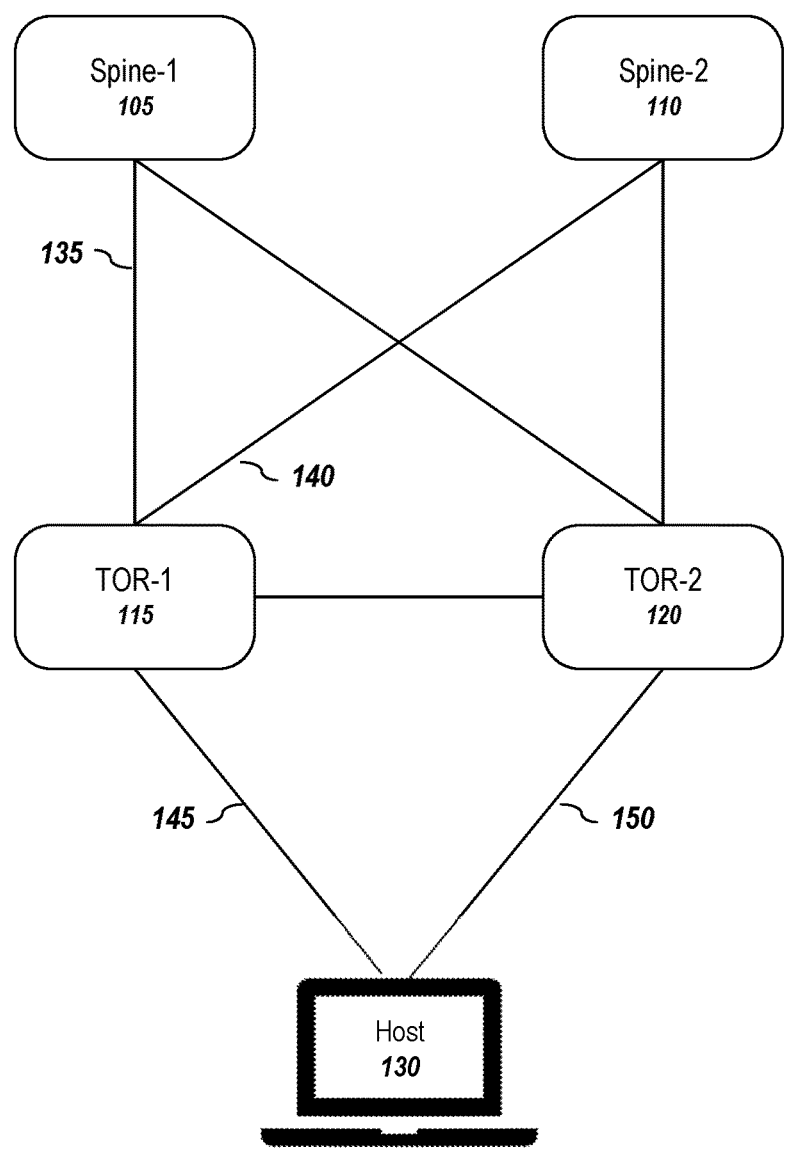
FIG. 1 ("FIG. 1") depicts an example multi-homed network.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled,"

"interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of a top-of-rack (TOR) information handling system, network interface controllers, etc., aspects of the present disclosure are not so limited. Accordingly, the aspects of the present disclosure may be applied or adapted for use in other contexts. Also, it shall be noted that while discussions herein are in the context of link failures, it shall be understood that embodiments herein also apply to failures of physical port(s) of the uplink(s).

A. General Overview

Consider, by way of illustration, the example multi-homed network 100 depicted in FIG. 1. As shown in FIG. 1, a top-of-rack (TOR) information handling system, TOR-1 115 (which may be a switch or router), is connected to a network information handling system (e.g., a switch or router), Spine-1 105, via link 135 and is also connected to Spine-2 110 via link 140. TOR-1 115 is also connected to TOR-2 120, which is connected to Spine-1 105 and Spine-2 110. A host system 130 connects to each of TOR-1 and TOR-2. For the host system 130, the TOR devices provide access to the networks accessible via the spine devices (i.e., Spine-1 and Spine-2). The links between the host and the TOR device are typically referred to as downlinks, and the links from the TOR devices to the spines are typically referred to as uplinks. As depicted in FIG. 1, all the uplinks and downlinks are functional.

As noted above, in multi-homing deployments, the TORs are typically configured or enabled with a feature called uplink failure detection (UFD) or link state tracker. When there is a failure in the configured number of uplinks, the feature operating on the TOR triggers the TOR's downlink or downlinks to shut down so that traffic from downstream information handling systems may take an alternate path or paths.

An example of this situation is illustrated in FIG. 2, which depicts the same network 100 that was shown in FIG. 1; however, there are link failures. As shown in FIG. 2, the two uplinks for TOR-1 115, namely link 135 and link 140, have failed. The x's (x 205 and x 210) and the dashed lines indicate that these two links are no longer operational. Because both uplinks for TOR-1 115 are no longer operational, TOR-1 115 will shut down its downlink 145 to host 130. Note that there is nothing physically or technically wrong with the link 145, but because TOR-1's uplinks are not operational, the uplink failure detection or link state tracker operating on TOR-1 will shutdown 215 the downlink 145 to prevent the host from sending it data traffic. In the multi-homed network 100, with link 145 now shutdown, the host 130 will instead direct all of its data traffic to TOR-2 via link 150.

As noted above, while there may be some benefits to this mechanism, it also has some significant drawbacks. Currently, downlinks, such as downlink 145 in FIG. 2, are either operational or shutdown based on the number of uplinks that are expected to be active. For example, in the topology 100 depicted in FIG. 2, if both uplinks for TOR-1 fail, then TOR-1 will shut down the downlink 145. However, if a subset of links fail, no action is taken. Returning to FIG. 2 for sake of illustration, if only one of the uplinks failed (e.g., link 135 failed but link 140 remained operational), TOR-1 takes no action relative to its downlink 145 or to host 130. Thus, the host 130 may send data traffic equally to both TORs, as if both paths are operational.

Also, as noted above, there is a drawback to specifying the active number of uplinks. If, for instance, a TOR has three uplinks and a user specifies that there must be a minimum of two active uplinks, when two uplinks fail, the downlink(s) would be shut down—even if there is a bandwidth for one uplink. As a result, data traffic is completely diverted from the affected TOR to other branch(es) of the topology/network—even though the affected TOR could process at least some data. As a result, this scenario produces suboptimal network utilization.

Accordingly, embodiments herein address these suboptimal uplink failure handling scenarios by implementing uplink rebalancer embodiments, in which load balance may be based upon link bandwidth. In one or more embodiments, uplink rebalancing may be coordinated using agents operating on the TORs, smart network interface controllers (NICs) on the host, and by setting link priorities.

B. Uplink Rebalancing Embodiments

Figure 3:
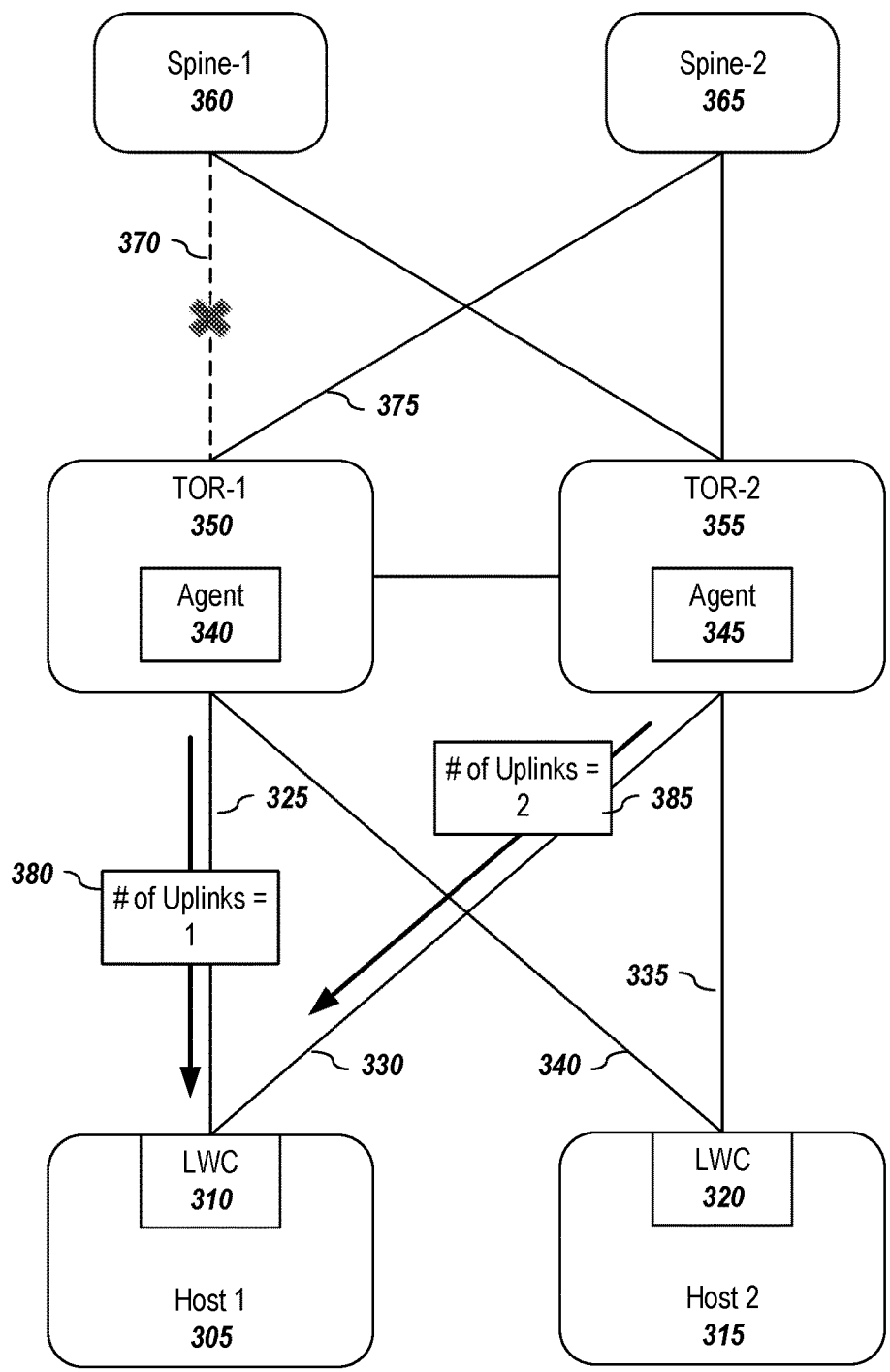
FIG. 3 depicts an example system that facilitates uplink rebalancing, according to embodiments of the present disclosure.

FIG. 3 depicts an example system that facilitates uplink rebalancing, according to embodiments of the present disclosure. As shown in FIG. 3, a top-of-rack (TOR) information handling system, TOR-1 350 (which may be a switch or router), is connected to a network information handling system (e.g., a switch or router), Spine-1 360, via link 370 and is also connected to Spine-2 365 via link 375. TOR-1 350 is also connected to TOR-2 355, which is similarly connected to Spine-1 360 and Spine-2 365.

The network system 300 also includes two host systems, which are information handling systems, such as servers or computers. Host 1 system 305 connects to each of TOR-1 and TOR-2 via links 325 and 330, respectively. Host 2 system 315 also connects to each of TOR-1 and TOR-2 via links 335 and 340, respectively. For the host systems, the TOR devices provide access to the networks accessible via the spine devices. While the network system 300 depicted in FIG. 3 is similar to the network 100 depicted in FIGS. 1 and 2, there are some key differences.

As illustrated in FIG. 3, each of the TOR devices includes an agent operating on the TOR device that monitors the status of its TOR device's uplinks. For example, the agent 340 operating on TOR-1 350 monitors (which should be understood to comprise actively monitoring or monitoring by receiving information from the TOR) regarding the status of the uplinks. As will be explained in more detail below, the agent communicates any change in status to affected hosts.

With the advent of smart network integrated controllers (NICs) with increased memory and processing power, more complex software, features, and logic may be performed by the NICs. As depicted in FIG. 3, in one or more embodiments, a link weight coordinator (LWC), which may also be referred to as an agent, runs on network integrated controllers of the host devices. The LWCs operate in conjunction with the agents running on the TOR devices.

FIG. 4 depicts a method performed by agents operating to monitor the state of the uplinks, according to embodiments of the present disclosure. In one or more embodiments, an agent operating (405) on a TOR/information handling system monitors the status of one or more uplinks of the TOR, which provide access to one or more networks. When a change to the status of one or more uplinks of the TOR occurs, it is detected (410) by the agent. Responsive to the agent detecting the change of status, the agents sends (415) a message regarding the change of status to a LWC operating on a network interface controller (NIC) of a host that is communicatively coupled to the TOR and is potentially affected by the change of status of the uplink. Currently, no systems in multi-home environments provide such messaging between network devices so that affected devices can change their data traffic processing accordingly.

Consider, by way of illustration, the example depicted in FIG. 3. As illustrated, one of the uplinks, link 370, for TOR-1 350 becomes inoperable, as indicated by the "x" and dashed the line. The agent 340 operating on TOR-1 detects this change, and the agent 340 notifies the LWC(s) running on the appropriate downlink host devices connected to the TOR-1. For example, as illustrated, TOR-1 sends a message 380 to Host 1 305. While not shown, TOR-1 may also send a message to Host 2 315 as well. In one or more embodiments, the message 380 comprises the number of active uplinks the TOR currently has operational. Note that, initially, both TOR-1 and TOR-2 had two uplinks. As part of the initialization of the uplinks or when the hosts connect to the TOR devices, a message (e.g., message 385, which represents an initialization message from TOR-2 to the LWC 310 on Host 1 305) may be sent indicating the number of available uplinks. Given that initially each TOR had 2 operational uplinks, the LWC 310 on the host receives notifications that there are 2 uplinks on each of the two TORs (2:2) to which it is connected. Thus, Host 1 would hash data traffic equally towards each of the TORs.

However, when TOR-1's link 370 to Spine-1 360 fails, and TOR-1 updates the number of links it has to 1, the LWC 310 on Host 1 305 now considers that its connected link 325 to TOR-1 should have a less weight than its connected link 330 to TOR-2 for the uplink traffic. Thus, in one or more embodiments, the LWC 310 (or Host 1) programs the smart NIC to change the hashing for the data traffic. For example, the hashing may be set to 1:2, in which 33% of the data traffic is sent to TOR-1 and 67% to TOR-2. In one or more embodiments, the hashing may also consider other factors, such as the bandwidth of the uplink(s) that are active. Thus, in one or more embodiments, the message from an agent to affected LWCs may include additional information, such as bandwidth of links, connections of links, or other information that may be useful for load balancing or for handling data traffic. It should be noted that the LWC 320 and Host 2 315 may operate in like manner.

It should also be noted that locally switched traffic, which does not utilize an uplink on a TOR device may not be hashed using this ratio because the uplink failure will not affect it. For example, if traffic is sent from Host 1 to Host 2, it may be sent without restriction to TOR-1 because it will be routed to Host 2 at TOR-1 and will not use any uplink (e.g., link 375). In one or more embodiments, locally switched traffic may be adjusted to favor the TOR device that has the inoperative uplink(s) because it will be processing less (or no) uplink data traffic. Sending more (or even all) locally switched data traffic to the affected TOR (in this example, TOR-1) reduces the load on the other TORs (in this example, TOR-2). In this manner, the other TORs that are now processing more uplink data traffic (i.e., data traffic that needs to be sent on an uplink) have a reduced burden for handling local data traffic.

In the case in which TOR-1's other uplink fails, TOR-1 updates all LWCs with "number of uplinks" set to zero. Thus, the LWCs program to stop uplink traffic to TOR-1. In one or more embodiments, if the NIC has capability to identify locally switched traffic in the TOR versus traffic taking the uplinks in the TOR, the NIC may change the processing so that only locally switched/routed traffic that be sent via link 325 to TOR-1.

In one or more embodiments, if the status of the down uplink (i.e., link 370) changes from inoperable to operable, the agent 340 in TOR-1 would detect the change and send a new message to the potentially affected LWCs (e.g., LWC 310 and LWC 320). As a result, the load balancing at the host system(s) may be adjusted to reflect this change in the network.

It shall be noted that embodiments herein that facilitate the modifying of data traffic load balancing on the NICs based on a TOR's message does not currently exist. This solution helps efficiently utilize the network pathways.

Figure 5:
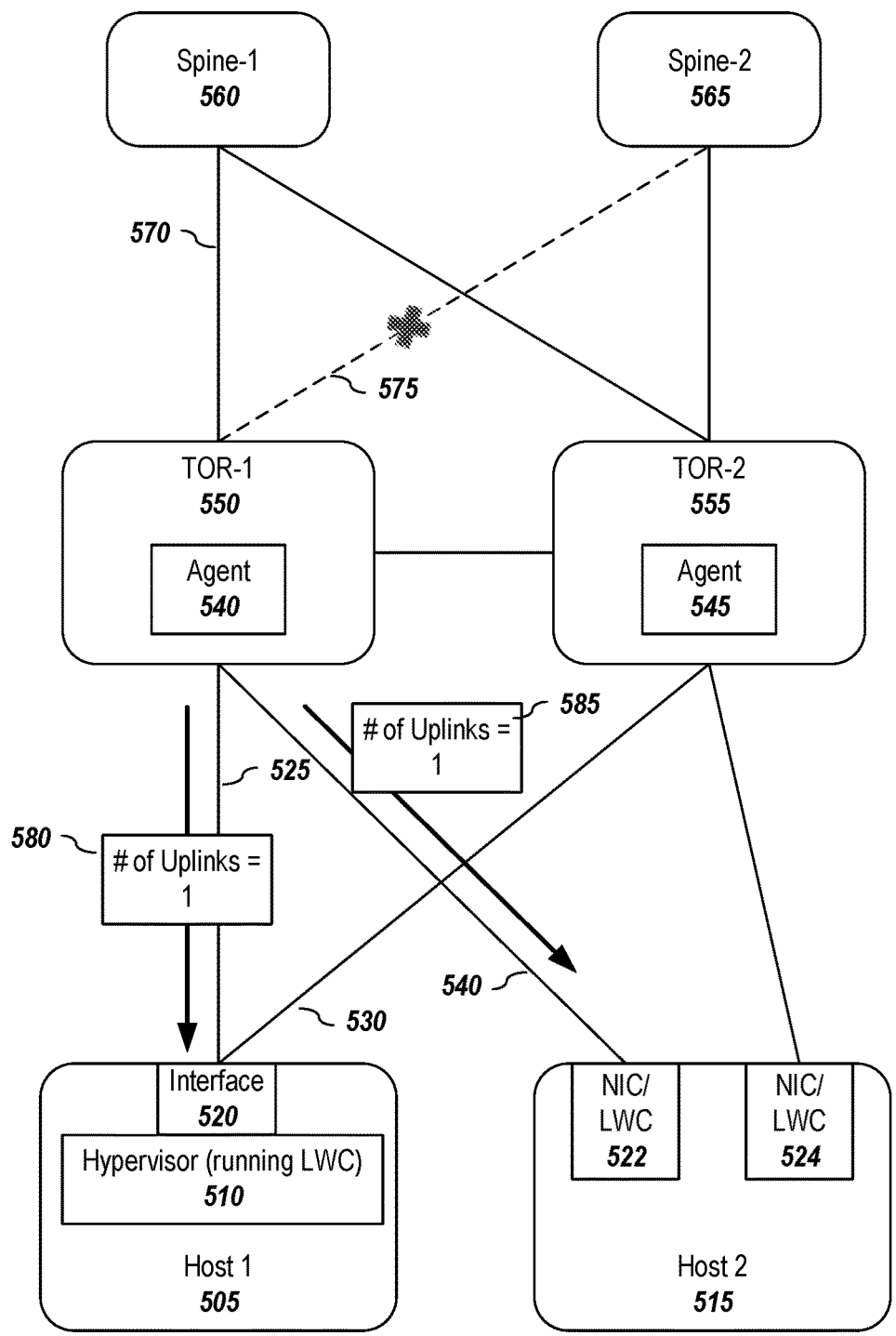
FIG. 5 depicts an example system that facilitates uplink rebalancing, according to embodiments of the present disclosure.

It shall also be noted that, even though the above embodiments focused on smart NICs, the host-side logic may be applied in other environments and other scenarios. Consider the network system 500 depicted in FIG. 5. The system 500 in FIG. 5 is similar to that of FIG. 3; however, different embodiments are depicted relative to the host systems 505 and 515.

Starting with Host 1 505, in one or more embodiments, it shall be noted that the functionality of the link weight controller (LWC) is not limited to operating on a network interface controller. As illustrated in FIG. 5, Host 1 505 comprises a hypervisor that supports one or more virtual machines. In one or more embodiments, a LWC operates on or in conjunction with the hypervisor 510, which controls the different physical NICs or interfaces 520 attached to the host. Thus, in one or more embodiments, the agent at the TOR can communicate with the LWC in the hypervisor. For example, if the status of link 575 of TOR-1 changes to inoperative, the agent 540 sends a message 580 to the LWC agent at the hypervisor 510. Having received the notice of the change of status, the LWC may operate in like manner as discussed in the embodiments, above. Also, it shall be noted that since the hypervisor can control a number of different ports or interfaces on the hosts, the LWC agent can set corresponding weights on a number of different individual ports on the host. For example, the agent may be a link weight controller.

Turning now to the embodiment example depicted by Host 2 515. Host 2 depicts two independent NICs 522 and 524. In FIG. 5, assume that the status of link 575 of TOR-1 changes to inoperative. A message 585 is sent from the agent 540 of TOR-1 550 to the LWC/NIC 522. Having received the message about the change of link status, the LWC may operate in like manner as discussed in the embodiments, above. However, it shall be noted that, in one or more embodiments, the LWCs (i.e., LWC 522 and LWC 524) may coordinate to help load balance data traffic. In one or more embodiments, the LWCs may communicate weights for hashing traffic or may work to tune the weights for better load balances. For example, LWC 522 and LWC 524 may coordinate so that all (or most) locally routed/switched traffic intended for Host 1 505 is sent via NIC 522 and traffic that needs to utilize an uplink is weighted 1:2 for NIC 522 and NIC 524, respectively.

In one or more embodiments, a plugin to a bonding protocol or protocols, such as Link Aggregation Control Protocol (LACP), can be used to communicate with the TORs to obtain weights or information relevant to setting weights and may be used to set weights accordingly. One skilled in the art shall recognize that a plugin embodiment has an advantage that the protocol itself can run in either a host, a hypervisor, or a NIC.

Figure 6:
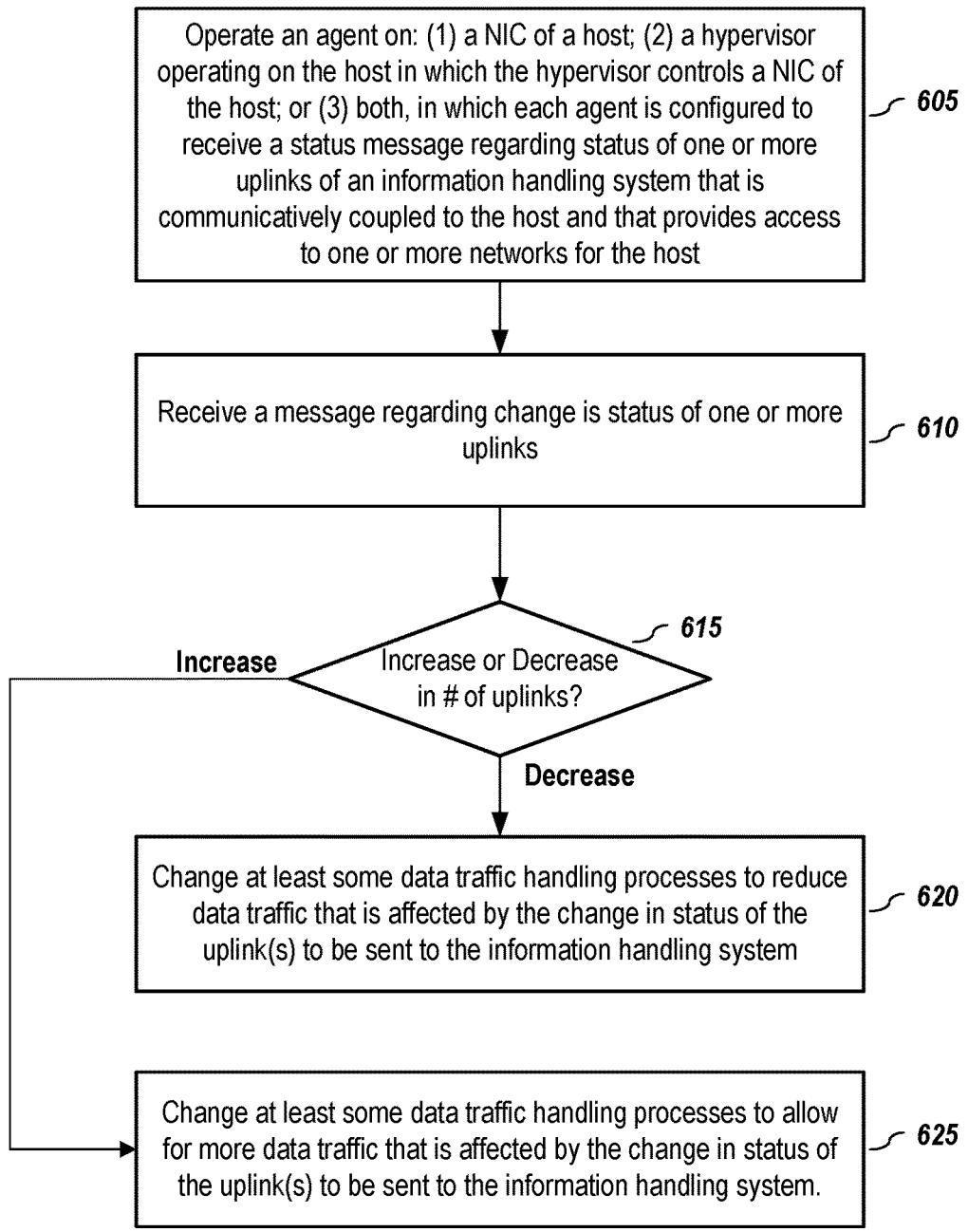
FIG. 6 depicts a method performed by an agent or agents operating at a host system, according to embodiments of the present disclosure.

FIG. 6 depicts a method performed by an agent or agents operating at a host system, according to embodiments of the present disclosure. In one or more embodiments, an agent or agents operate (605) on: (1) a NIC of a host; (2) a hypervisor operating on the host in which the hypervisor controls a NIC of the host; or (3) both, in which each agent is configured to receive a status message regarding status of one or more uplinks of an information handling system that is communicatively coupled to the host. For example, the agent may be a link weight controller (LWC) operating in a NIC (e.g., LWC on NIC 522) and/or an LWC operating on a hypervisor (e.g., LWC on hypervisor 510).

In one or more embodiments, the agent or agents receive (610) a message regarding change in status of one or more uplinks. For example, LWC 522 and LWC on NIC interface 520 each receive a message 585 and 580, respectively, from an agent 540 operating on a TOR information handling system 550, in which the status of one of its links has changed. In this example, the link 575 has become inoperable. Thus, the messages indicate that there is only one functioning uplink for TOR-1 550.

In one or more embodiments, the agents may ascertain (615) whether the change represents an increase or a decrease in the number of uplinks. To facilitate comparison, the LWC agents may store prior link state information, such as the number of active uplinks for each connected uplink system.

In response to the message indicating that the change is a reduction in active uplinks, the LWC agent facilitates a change (620) that results in at least some data traffic handling processes to reduce data traffic that is affected by the change in status of the uplink(s) to be sent to the affected information handling system (e.g., TOR-1). For example, for Host 1 505, more data that needs an uplink pathway may be sent via link 530 to TOR-2 555, and for Host 2, the LWCs may coordinate so that more data that needs an uplink pathway is sent via NIC 524. Also, as noted above, local traffic (e.g., traffic from Host-1 to Host-2, or vis-a-versa) may be unchanged or may be weighted more to the affected TOR (e.g., TOR-1).

In one or more embodiments, if the change results in there being no uplinks for the affected device, all data traffic may be stopped from being sent to that device. Alternatively, local traffic may still be sent to the affected device since uplinks are not needed for switching/routing that data.

In response to the message indicating that the change is an increase in active uplinks, the LWC agent facilitates a change (625) that results in at least some data traffic handling processes to allow for more data traffic that is affected by the change in status of the uplink(s) to be sent to the affected information handling system (e.g., TOR-1).

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 7:
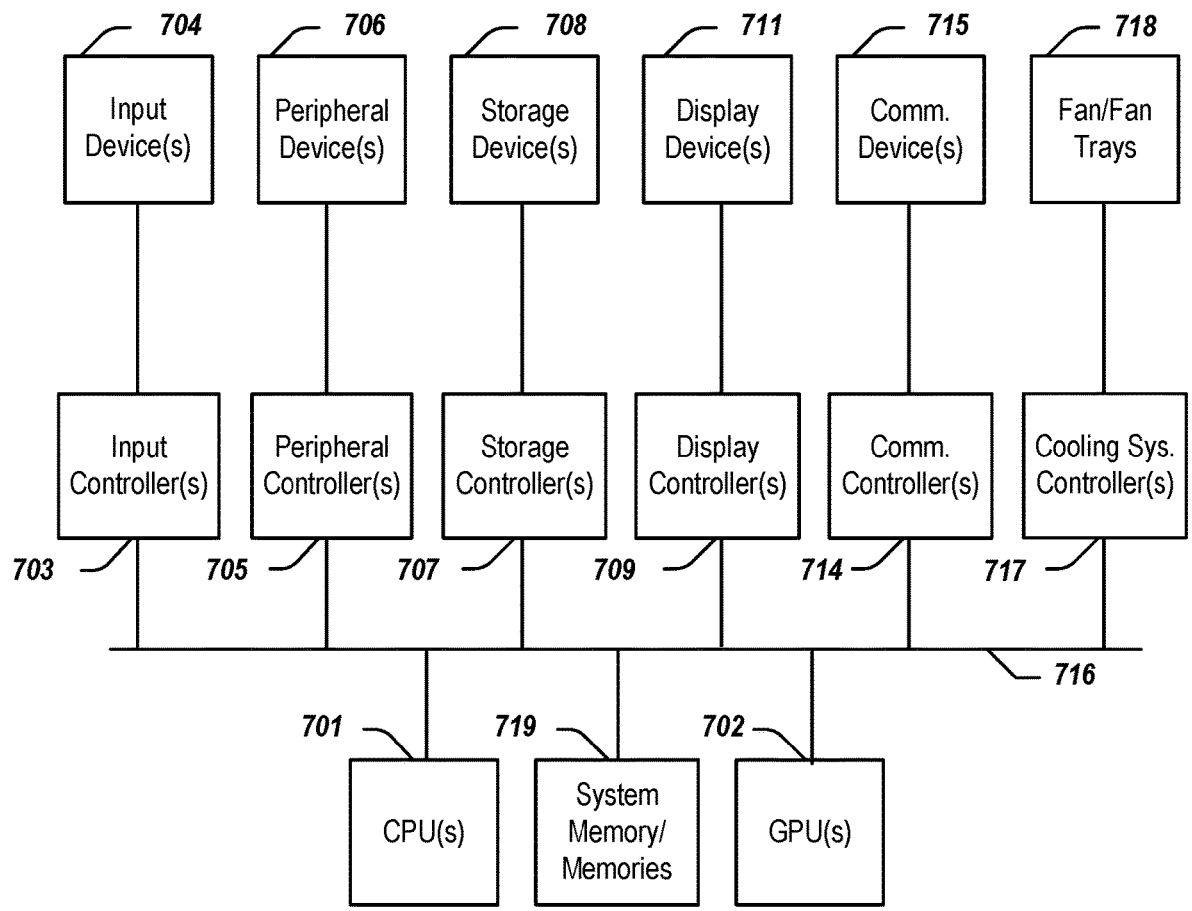
FIG. 7 depicts a simplified block diagram of an information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 8:
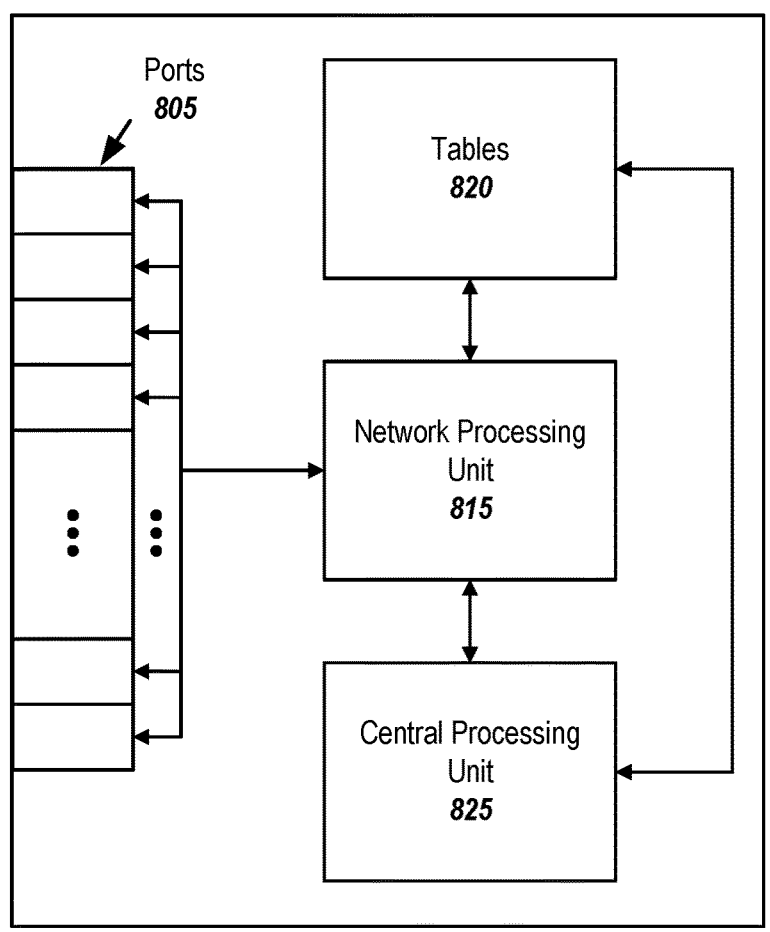
FIG. 8 depicts an alternative block diagram of an information handling system, according to embodiments of the present disclosure.

FIG. 8 depicts an alternative block diagram of an information handling system, according to embodiments of the present disclosure. It will be understood that the functionalities shown for system 800 may operate to support various embodiments of the present disclosure—although it shall be understood that such system may be differently configured and include different components, additional components, or fewer components.

The information handling system 800 may include a plurality of I/O ports 805, a network processing unit (NPU) 815, one or more tables 820, and a central processing unit (CPU) 825. The system includes a power supply (not shown) and may also include other components, which are not shown for sake of simplicity.

In one or more embodiments, the I/O ports 805 may be connected via one or more cables to one or more other network devices or clients. The network processing unit 815 may use information included in the network data received at the node 800, as well as information stored in the tables 820, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
    using an agent operating on an information handling system to monitor status of one or more uplinks of the information handling system that provide access to one or more networks;
    detecting, via the agent, a change of status of an uplink of the information handling system; and
    responsive to the agent detecting the change of status of the uplink of the information handling system, sending a message regarding the change of status to: (1) a second agent operating on a network interface controller (NIC) of a host that is physically distinct from and communicatively coupled to the information handling system and is potentially affected by the change of status of the uplink; (2) a hypervisor operating on the host that controls a NIC that is potentially affected by the change of status of the uplink; or (3) both.

2. The computer-implemented method of claim 1 wherein the change is in status is that the uplink is no longer operative.

3. The computer-implemented method of claim 1 wherein the change in status is that the uplink has changed to active status.

4. The computer-implemented method of claim 1 wherein the message comprises information that is related to a number of active uplinks for the information handling system.

5. The computer-implemented method of claim 4 further comprising:
    responsive to the message comprising information that indicates that there are no active uplinks for the information handling system, not receiving any data traffic from the host.

6. The computer-implemented method of claim 4 further comprising:
    responsive to the message comprising information that indicates that there are fewer active uplinks for the information handling system, signaling to the host, via the message, to reduce data traffic from the host to the information handling system.

7. The computer-implemented method of claim 4 further comprising:
    responsive to the message comprising information that indicates that there are more active uplinks for the information handling system, signaling to the host, via the message, that the host can increase data traffic to the information handling system.

8. A computer-implemented method comprising:
    operating an agent on: (1) a NIC of a host; (2) a hypervisor operating on the host in which the hypervisor controls a NIC of the host; or (3) both, in which the agent is configured to receive a status message regarding status of one or more uplinks of an information handling system that is physically distinct from and communicatively coupled to the host and that provides access to one or more networks for the host;
    responsive to the agent operating on the NIC, the agent operating on the hypervisor, or both agents receiving a message that an uplink of the information handling system is no longer active, changing at least some data traffic handling processes to reduce data traffic that is affected by a change in status of the uplink to be sent to the information handling system; and
    responsive to the agent operating on the NIC, the agent operating on the hypervisor, or both agents receiving a message that an uplink is now active, changing at least some data traffic handling processes to allow for more data traffic that is affected by the change in status of the uplink to be sent to the information handling system.

9. The computer-implemented method of claim 8 further comprising:
    responsive to the host determining that data traffic is local traffic and is not affected by the change in status, not changing the data traffic for the local traffic.

10. The computer-implemented method of claim 8 wherein the message comprises information that is related to a number of active uplinks for the information handling system.

11. The computer-implemented method of claim 8 wherein the step of changing at least some data traffic handling processes to reduce data traffic that is affected by the change in status of the uplink to be sent to the information handling system comprises:
    responsive to the message comprising information that indicates that there are no active uplinks for the information handling system, not sending any data traffic to the information handling system.

12. The computer-implemented method of claim 8 wherein the step of changing at least some data traffic handling processes to reduce data traffic that is affected by the change in status of the uplink to be sent to the information handling system comprises:
    responsive to the message comprising information that indicates that there are fewer active uplinks but at least one active uplink for the information handling system, changing load balancing of data traffic that is affected by the change in status of the uplink to reduce an amount of such data traffic to the information handling system.

13. The computer-implemented method of claim 8 wherein two or more agents of the host receive the message and are affected by the change in status of one or more uplinks of the information handling system, the method further comprising:

coordinating, via at least one of the two or more agents, load balancing of data traffic to the information handling system.

14. The computer-implemented method of claim 13 wherein the at least one of the two agents communicate a weighting factor or factors to coordinate the load balancing.

15. An information handling system comprising:
a network interface controller communicatively coupled to one or more ports for connecting the information handling system to a plurality of network node computing devices and that comprises an agent that is configured to:
receive a message regarding status of one or more uplinks of one of the network node computing devices that is physically distinct from and communicatively coupled to the information handling system;
responsive to receiving a message that an uplink of one of the network node computing devices is no longer active, cause at least some data traffic handling processes to reduce data traffic that is affected by a change in status of the uplink to be sent to the network node computing device; and
responsive to receiving a message that an uplink of one of the network node computing devices is now active, cause at least some data traffic handling processes to allow for more data traffic that is affected by the change in status of the uplink to be sent to the network node computing device;
one or more processors for processing data traffic; and
a non-transitory computer-readable medium or media communicatively coupled to at least one of the one or more processors.

16. The information handling system of claim 15 wherein responsive to the information handling system determining that data traffic is local traffic and is not affected by the change in status, not changing the data traffic for the local traffic.

17. The information handling system of claim 15 wherein the message comprises information that is related to a number of active uplinks for one of the network node computing devices.

18. The information handling system of claim 15 wherein the agent is configured to cause at least some data traffic handling processes to reduce data traffic that is affected by a change in status of the uplink to be sent to the network node computing device by performing the step comprises:
responsive to the message comprising information that indicates that there are no active uplinks for the network node computing device, causing the information handling system to not send any data traffic to the network node computing device.

19. The information handling system of claim 15 wherein the agent is configured to change at least some data traffic handling processes to reduce data traffic that is affected by the change in status of the uplink to be sent to the network node computing device by performing the step comprises:
responsive to the message comprising information that indicates that there are fewer active uplinks but at least one active uplink for the network node computing device, changing load balancing of data traffic that is affected by the change in status of the uplink to reduce an amount of such data traffic to the network node computing device.

20. The information handling system of claim 15 wherein two agents are configured to coordinate load balancing of data traffic to the network node computing device responsive to receiving a message that an uplink of one of the network node computing devices that affects both agents has changed.

* * * * *